United States Patent
Hinoki et al.

(10) Patent No.: US 8,216,718 B2
(45) Date of Patent: *Jul. 10, 2012

(54) ANODE AND LITHIUM-ION SECONDARY BATTERY

(75) Inventors: Kiyonori Hinoki, Tokyo (JP); Yousuke Miyaki, Tokyo (JP); Kazuo Katai, Tokyo (JP)

(73) Assignee: TDK Corporation, Tokyo (JP)

( * ) Notice: Subject to any disclaimer, the term of this patent is extended or adjusted under 35 U.S.C. 154(b) by 733 days.

This patent is subject to a terminal disclaimer.

(21) Appl. No.: 12/053,838

(22) Filed: Mar. 24, 2008

(65) Prior Publication Data

US 2008/0248387 A1 Oct. 9, 2008

(30) Foreign Application Priority Data

Mar. 29, 2007 (JP) ................................ P2007-088644

(51) Int. Cl.
*H01M 4/13* (2010.01)
*H01M 4/60* (2006.01)
*H01M 4/62* (2006.01)

(52) U.S. Cl. ........ 429/212; 429/213; 429/215; 429/232; 429/231.95

(58) Field of Classification Search .................. 429/124, 429/127, 209, 212, 213, 215, 216, 218.1, 429/231.95, 232
See application file for complete search history.

(56) References Cited

U.S. PATENT DOCUMENTS

| | | | |
|---|---|---|---|
| 5,795,678 A | | 8/1998 | Takami et al. |
| 2003/0054249 A1* | | 3/2003 | Yamamoto et al. ........ 429/231.1 |
| 2006/0024579 A1* | | 2/2006 | Kolosnitsyn et al. ......... 429/209 |
| 2006/0251965 A1 | | 11/2006 | Nagayama et al. |
| 2007/0092797 A1* | | 4/2007 | Konishiike et al. ........ 429/218.1 |
| 2009/0173632 A1 | | 7/2009 | Nagayama et al. |

FOREIGN PATENT DOCUMENTS

| | | |
|---|---|---|
| CN | 1113351 A | 12/1995 |
| CN | 1830102 A | 9/2006 |
| JP | 08-153514 | * 11/1996 |
| JP | A-11-126600 | 5/1999 |
| JP | A-2000-251890 | 9/2000 |
| JP | A-2002-175810 | 6/2002 |
| JP | A-2003-142075 | 5/2003 |
| JP | A-2004-127913 | 4/2004 |

(Continued)

OTHER PUBLICATIONS

Office Action issued in Japanese Patent Application No. 2007-088644 on Sep. 4, 2009.

(Continued)

*Primary Examiner* — Ula C Ruddock
*Assistant Examiner* — Frank Chernow
(74) *Attorney, Agent, or Firm* — Oliff & Berridge, PLC

(57) ABSTRACT

An anode is provided as one capable of suppressing rapid entrance/exit of lithium ions during quick charge-discharge and ensuring sufficient safety in use as an anode of a lithium-ion secondary battery. The anode is an anode for lithium-ion secondary battery having a current collector, and an active material-containing layer formed on the current collector, wherein the active material-containing layer is comprised of an outermost layer disposed on the farthest side from the current collector, and a lower layer composed of at least one layer disposed between the outermost layer and the current collector, and wherein a degree of flexion of the outermost layer is larger than a degree of flexion of the lower layer.

12 Claims, 11 Drawing Sheets

FOREIGN PATENT DOCUMENTS

| | | | |
|---|---|---|---|
| JP | A-2005-063955 | | 3/2005 |
| JP | A-2005-222933 | | 8/2005 |
| JP | A-2005-317493 | | 11/2005 |
| JP | A-2006-210003 | | 8/2006 |
| JP | 2006-210003 | * | 10/2006 |
| WO | WO 2006/010894 A1 | | 2/2006 |

OTHER PUBLICATIONS

Chinese Patent Office, English translation of Chinese Office Action for Chinese Patent Application No. 200810086914.9, Dec. 14, 2010, pp. 1-4.

* cited by examiner

ANODE AND LITHIUM-ION SECONDARY BATTERY

BACKGROUND OF THE INVENTION

1. Field of the Invention

The present invention relates to an anode and a lithium-ion secondary battery.

2. Related Background Art

The high-output lithium-ion secondary batteries are recently being used for power tools and automobiles (e.g., cf. Japanese Patent Application Laid-open Nos. 2005-63955, 2004-127913, 2005-317493, 2000-251890, 2003-142075, and 2005-222933). The lithium-ion secondary batteries used for these purposes are required to provide high output and high safety together.

However, when the lithium-ion secondary battery is used for a power tool or an automobile, the anode is likely to undergo rapid entrance/exit of lithium ions. When the rapid entrance/exit of lithium ions occurs in the anode, lithium ions rapidly intercalate into an active material of the anode to cause extremely large expansion of the anode active material, whereby the anode is likely to undergo rapid deformation, which tends to pose a problem in battery performance and safety of the lithium-ion secondary battery. In the conventional technology, however, little study has been conducted theretofore on suppression of the rapid entrance/exit of lithium ions in the anode in the lithium-ion secondary battery.

SUMMARY OF THE INVENTION

The present invention has been accomplished in view of the problem in the conventional technology and an object of the present invention is to provide an anode capable of suppressing the rapid entrance/exit of lithium ions during quick charge-discharge and ensuring sufficient safety together in use as an anode of a lithium-ion secondary battery, and a lithium-ion secondary battery using the anode.

In order to achieve the above object, the present invention provides an anode for lithium-ion secondary battery comprising a current collector, and an active material-containing layer formed on the current collector, wherein the active material-containing layer is comprised of an outermost layer disposed on the farthest side from the current collector, and a lower layer composed of at least one layer disposed between the outermost layer and the current collector, and wherein a degree of flexion of the outermost layer is larger than a degree of flexion of the lower layer.

Since this anode comprises the active material-containing layer comprised of the outermost layer and the lower layer with the different degrees of flexion, when it is applied to a lithium-ion secondary battery, the existence of the outermost layer with the larger degree of flexion suppresses the rapid entrance/exit of lithium ions on the anode side whereby lithium ions are prevented from rapidly intercalating into anode active material particles during charge. Furthermore, the lower layer with the smaller degree of flexion serves as a buffer zone, and it absorbs expansion of the active material particles caused by intercalation of lithium ions thereinto, so as to prevent deformation of the anode. The synergy effect of these outermost layer and lower layer thus adequately prevents the anode from being deformed during quick charge. Rapid constriction of the anode active material particles is also suppressed in the anode during quick discharge, so as to adequately prevent deformation of the anode. On the other hand, the existence of the outermost layer on the anode side also suppresses rapid entrance/exit of lithium ions on the cathode side, so as to succeed in suppression of the rapid entrance/exit of lithium ions on the cathode side, whereby lithium ions are prevented from rapidly intercalating into or deintercalating from the cathode active material particles during charge-discharge. For this reason, it is feasible to adequately prevent deformation of the cathode during quick charge-discharge, occurrence of distortion of the crystal structure of cathode active material particles, and so on. With the anode of the present invention, therefore, it becomes feasible to adequately prevent deformation of both of the anode and the cathode during quick charge-discharge and to form a lithium-ion secondary battery with excellent safety.

In the anode of the present invention, preferably, the degree of flexion of the outermost layer is not less than 3.0 nor more than 24.0. When the degree of flexion of the outermost layer falls within the foregoing range, the rapid entrance/exit of lithium ions is more adequately suppressed during quick charge-discharge, so as to more adequately prevent the deformation of the anode and the cathode.

On the other hand, in the anode of the present invention, preferably, the degree of flexion of the lower layer is not less than 1.8 nor more than 3.0. When the degree of flexion of the lower layer falls within the foregoing range, the expansion and constriction of anode active material particles is more adequately absorbed by the lower layer, so as to more adequately prevent the deformation of the anode during quick charge-discharge.

In the anode of the present invention, preferably, a thickness of the outermost layer is smaller than a thickness of the lower layer. This enables more adequate prevention of the deformation of the anode during quick charge-discharge.

In the anode of the present invention, preferably, the thickness of the outermost layer is not less than 3 μm nor more than 30 μm and the thickness of the lower layer is not less than 50 μm nor more than 100 μm. This enables much more adequate prevention of the deformation of the anode and the cathode during quick charge-discharge.

Furthermore, in the anode of the present invention, preferably, an aspect ratio of active material particles contained in the outermost layer is not less than 3 nor more than 20. When the aspect ratio of the active material particles contained in the outermost layer (anode active material particles) falls within the foregoing range, the rapid entrance/exit of lithium ions is still more adequately suppressed during quick charge-discharge, so as to still more adequately prevent the deformation of the anode and the cathode.

The present invention also provides a lithium-ion secondary battery comprising an anode, a cathode, and an electrolyte layer disposed between the anode and the cathode, wherein the anode is the anode of the present invention.

In the present specification, the "anode" and "cathode" are determined on the basis of the polarities during discharge of the lithium-ion secondary battery, for convenience' sake of description. Therefore, the "anode" serves as a "cathode" and the "cathode" as an "anode" during charge.

Since the lithium-ion secondary battery is constructed using the anode of the present invention with the above-described effect, the deformation of the anode and the cathode is adequately prevented during quick charge-discharge and sufficient safety is ensured.

The present invention successfully provides the anode capable of suppressing the rapid entrance/exit of lithium ions during quick charge-discharge and ensuring the sufficient safety in use as an anode for a lithium-ion secondary battery, and the lithium-ion secondary battery using the anode.

DESCRIPTION OF THE PREFERRED EMBODIMENTS

Figure 1:
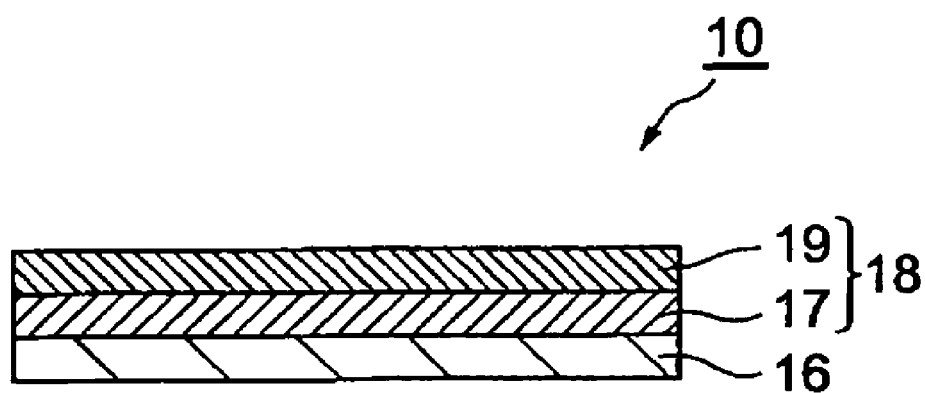
FIG. 1 is a schematic sectional view showing a basic configuration of an anode for lithium-ion secondary battery according to the present invention.

The preferred embodiments of the present invention will be described below in detail with reference to the drawings. Identical or equivalent portions will be denoted by the same reference symbols in the drawings, without redundant description. The vertical horizontal, and other positional relations are based on those in the drawings unless otherwise stated in particular. Furthermore, the dimensional ratios in the drawings are not limited to those illustrated.

An anode for lithium-ion secondary battery according to the present invention is one comprising a current collector, and an active material-containing layer formed on the current collector, wherein the active material-containing layer is comprised of an outermost layer disposed on the farthest side from the current collector, and a lower layer composed of at least one layer disposed between the outermost layer and the current collector, and wherein a degree of flexion of the outermost layer is larger than a degree of flexion of the lower layer.

FIG. 1 is a schematic sectional view showing a basic configuration of an anode for the lithium-ion secondary battery according to the present invention. As shown in FIG. 1, the anode 10 is composed of a current collector 16, and an active material-containing layer 18 formed on the current collector 16. The active material-containing layer 18 is comprised of an outermost layer 19 disposed on the farthest side from the current collector 16, and a lower layer 17 disposed between the outermost layer 19 and the current collector 16. The lower layer 17 may consist of one layer as shown in FIG. 1, or may consist of two or more layers. In the anode 10, the degree of flexion of the outermost layer 19 is larger than the degree of flexion of the lower layer 17.

Figure 2:
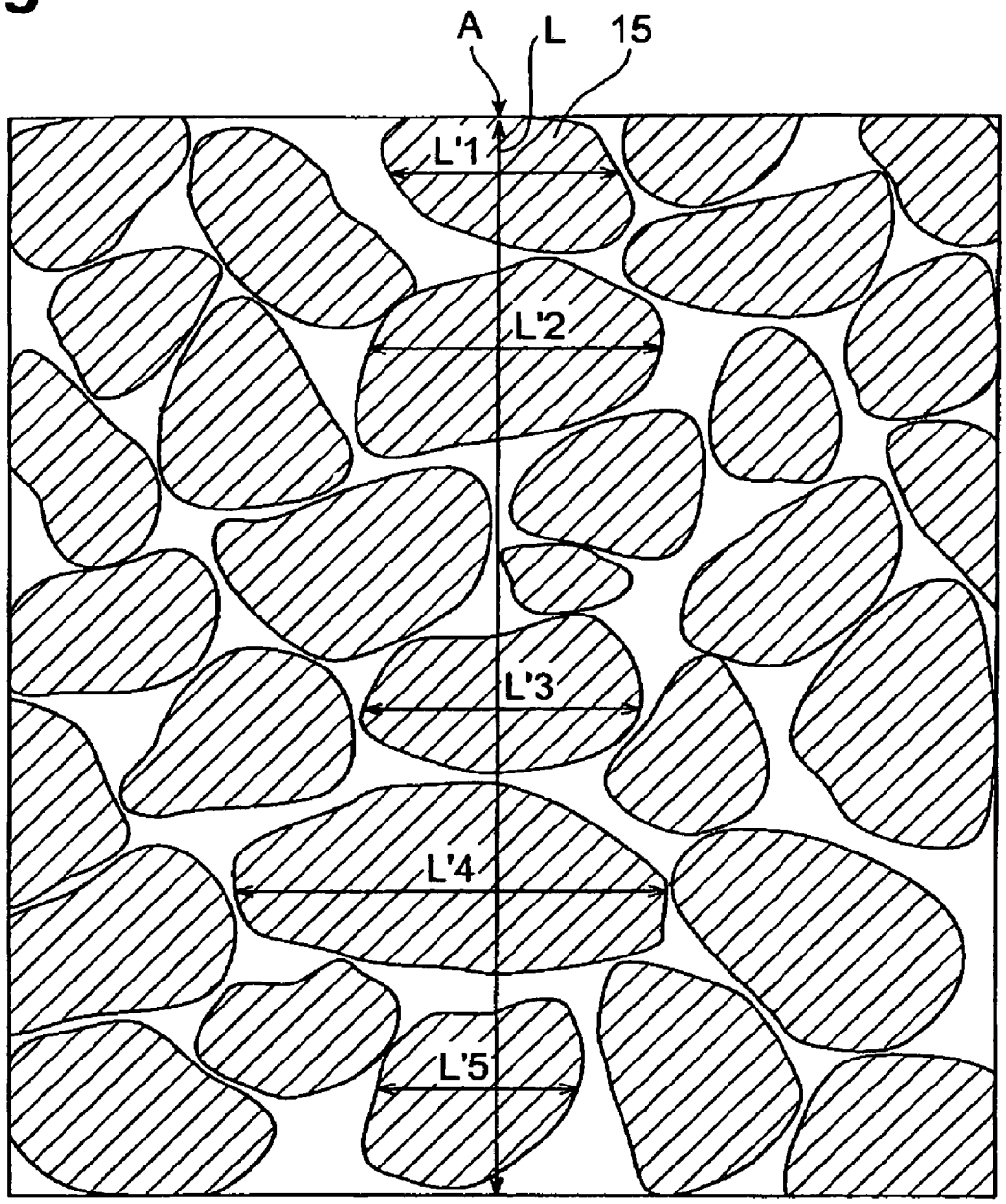
FIG. 2 is a schematic sectional view of a lower layer in the anode for lithium-ion secondary battery according to the present invention.

In the present invention the degree of flexion is determined as follows. FIG. 2 is a schematic sectional view of the lower layer 17. As shown in FIG. 2, the lower layer 17 has a structure in which active material particles 15 are bound by a binder (not shown). The degree of flexion is a value obtained by drawing a straight line A perpendicular to the lower layer 17 (i.e., parallel to the thickness direction), defining L as a length of the straight line, defining L' (in the same unit as L) as a numerical value of the sum of maximum diameters in the lateral direction (direction perpendicular to the foregoing straight line A) of active material particles 15 crossing the straight line A, and calculating a ratio (L'/L). For example, in FIG. 2, there are five active material particles 15 crossing the straight line A and the lateral maximum diameters thereof are L'1, L'2, L'3, L'4, and L'5, respectively. Therefore, the degree of flexion is determined by $\{(L'1+L'2+L'3+L'4+L'5)/L\}$.

For actually measuring the degree of flexion, a scanning electron microscope (SEM) photograph of a cross section of the lower layer 17 is taken at each of ten random points for each sample, the straight line A is drawn perpendicularly to the lower layer 17 in the center of each of those SEM photographs, the length L of the straight line A and the sum L' of lateral maximum diameters of active material particles 15 crossing the straight line A are measured in each photograph, the value of (L'/L) is calculated in each photograph, and an average of calculated values (L'/L) for the ten points is determined as the degree of flexion. It is noted that each SEM photograph should be taken so as to cover the whole thickness of the lower layer 17. Namely, the value L is equivalent to the thickness of the lower layer 17. In cases where the lower layer 17 is composed of two or more layers, each SEM photograph is also taken so as to cover the whole thickness of the lower layer 17 composed of two or more layers, and the degree of flexion is measured for the whole lower layer 17 by the same technique.

For the outermost layer 19, the degree of flexion thereof is also measured in the same manner as in the above-described case of the lower layer 17. In the present invention the degrees of flexion are values measured with the anode in an uncharged state.

The degree of flexion of the outermost layer 19 needs to be larger than the degree of flexion of the lower layer 17, and a specific numerical value thereof is preferably not less than 3.0 nor more than 24.0 and more preferably not less than 4.0 nor more than 22.0. If the degree of flexion of the outermost layer 19 is less than 3.0, the effect of suppressing the rapid entrance/exit of lithium ions tends to degrade. On the other hand, if the degree of flexion of the outermost layer 19 exceeds 24.0, it becomes difficult to achieve uniform application of the outermost layer 19, and the performance as a battery tends to become insufficient because of excessive suppression of entrance/exit of lithium ions.

The degree of flexion of the lower layer 17 needs to be smaller than the degree of flexion of the outermost layer 19, and a specific numerical value thereof is preferably not less than 1.8 nor more than 3.0 and more preferably not less than 1.9 nor more than 1.8. If the degree of flexion of the lower layer 17 is less than 1.8, the electrode density of coating film tends to decrease. On the other hand, if the degree of flexion of the lower layer 17 exceeds 3.0, the anode active material particles are arranged as tangled, so as to tend to make it harder to secure a sufficient buffer space for expansion and constriction of anode active material particles due to intercalation.

Each of constituent materials of the anode 10 will be described below.

There are no particular restrictions on the current collector 16 as long as it is a good conductor capable of implementing adequate movement of charge to the active material-containing layer 18. The current collector 16 can be one of the current collectors used in the well-known lithium-ion secondary batteries. For example, the current collector 16 can be a metal foil of copper, aluminum, or the like.

The outermost layer 19 is composed mainly of active material particles, and a binder. The outermost layer 19 may further contain a conductive aid.

There are no particular restrictions on the active material particles used in the outermost layer 19, as long as they can implement reversible progress of occlusion and release of lithium ions, desorption and insertion (intercalation) of lithium ions, or doping and dedoping with lithium ions and counter anions thereto (e.g., $ClO_4^-$). The active material particles can be well-known anode active material particles. Such active material particles can be, for example, particles of one selected from carbon materials such as natural graphite and artificial graphite (non-graphitizing carbon, graphitizing carbon, low temperature-calcined carbon, etc.), metals such as Al, Si, and Sn capable of combining with lithium, amorphous compounds consisting mainly of an oxide such as $SiO_2$ or $SnO_2$, and lithium titanate ($Li_4Ti_5O_{12}$). Among them, the carbon materials are preferably applicable, and the active material particles are more preferably those with the interlayer distance $d_{002}$ of the carbon material being 0.335-0.338 nm and the crystallite size $Lc_{002}$ of the carbon material being 30-120 nm. The carbon materials satisfying these conditions include artificial graphite, MCF (mesocarbon fiber), and so on. The interlayer distance $d_{002}$ and the crystallite size $Lc_{002}$ can be obtained by X-ray diffractometry.

From the viewpoint of making the degree of flexion of the outermost layer 19 larger, it is also preferable to use fibrous, acicular, or compressed metal oxide, activated carbon, graphite, or the like as the active material particles. These materials may be used singly or in combination with the aforementioned well-known anode active material particles.

The aspect ratio of the active material particles (which is a ratio of major-axis length to minor-axis length) is preferably not less than 3 nor more than 20 and more preferably not less than 4 nor more than 18. If the aspect ratio is less than 4, the effect of suppressing the rapid entrance/exit of lithium ions tends to degrade; if it exceeds 20, it becomes difficult to achieve uniform application and the performance as a battery tends to be insufficient because of excessive suppression of entrance/exit of lithium ions.

In the present invention, the aspect ratio of the active material particles contained in the outermost layer 19 after formed is preferably not less than 4 nor more than 30 and more preferably not less than 5 nor more than 28. The aspect ratio of the active material particles in the outermost layer 19 can be kept in the foregoing range by a method of using the active material particles originally having the aspect ratio in the foregoing range, or by a method of deforming the active material particles by press to bring the aspect ratio into the foregoing range. If this aspect ratio is less than 4, the effect of suppressing the rapid entrance/exit of lithium ions tends to degrade; if it exceeds 30, the performance as a battery tends to be insufficient because of excessive suppression of entrance/exit of lithium ions.

The average particle size (D50) of the active material particles used in the outermost layer 19 is preferably not less than 1.5 μm nor more than 20 μm and more preferably not less than 3 μm nor more than 18 μm. If this average particle size is less than 1.5 μm, it becomes difficult to disperse the active material particles and formation of a uniform coating film tends to become difficult; if it exceeds 20 μm, it becomes difficult to achieve uniform application and the performance as a battery tends to be insufficient because of excessive suppression of entrance/exit of lithium ions.

Any one of the well-known binders can be used as the binder used in the outermost layer 19, without any particular restrictions, and examples thereof include fluorocarbon polymers such as polyvinylidene fluoride (PVDF), polytetrafluoroethylene (PTFE), a tetrafluoroethylene-hexafluoropropylene copolymer (FEP), a tetrafluoroethylene-perfluoroalkylvinyl ether copolymer (PFA), an ethylene-tetrafluoroethylene copolymer (ETFE), polychlorotrifluoroethylene (PCTFE), an ethylene-chlorotrfluoroethylene copolymer (ECTFE), and polyvinyl fluoride (PVF). This binder binds the constituent materials, e.g., the active material particles and constituent materials such as the conductive aid added if necessary, together and also contributes to binding between those constituent materials and the current collector.

Besides the above examples, the binder may be, for example, one of vinylidene fluoride-based fluororubbers such as vinylidene fluoride-hexafluoropropylene fluororubber (VDF-HFP fluororubber), vinylidene fluoride-hexafluoropropylene-tetrafluoroethylene fluororubber (VDF-HFP-TFE fluororubber), vinylidene fluoride-pentafluoropropylene fluororubber (VDF-PFP fluororubber), vinylidene fluoride-pentafluoropropylene-tetrafluoroethylene fluororubber (VDF-PFP-TFE fluororubber), vinylidene fluoride-perfluoromethylvinylether-tetrafluoroethylene fluororubber (VDF-PFMVE-TFE fluororubber), and vinylidene fluoride-chlorotrifluoroethylene fluororubber (VDF-CTFE fluororubber).

Furthermore, in addition to the above examples, the binder may also be, for example, one of polyethylene, polypropylene, polyethylene terephthalate, aromatic polyamide, cellulose, styrene-butadiene rubber, isoprene rubber, butadiene rubber, and ethylene-propylene rubber. The binder may also be one of thermoplastic elastomer polymers such as styrene-butadiene-styrene block copolymers and hydrogenated derivatives thereof, styrene-ethylene-butadiene-styrene copolymers, and styrene-isoprene-stryene block copolymers and hydrogenated derivatives thereof. Furthermore, the binder may be one of syndiotactic 1,2-polybutadiene, ethylene-vinyl acetate copolymers, and propylene-α-olefin (C2-C12 olefin) copolymers. In addition, it may be one of electrically-conductive polymers.

There are no particular restrictions on the conductive aid used according to need in the outermost layer 19, and the conductive aid can be any one of the well-known conductive aids. Examples of such conductive aids include carbon blacks, carbon materials, fine powders of metals such as copper, nickel, stainless steel, and iron, mixtures of the carbon materials and the fine powders of metals, and electrically conductive oxides such as ITO.

The content of the active material particles in the outermost layer 19 is preferably not less than 80% by mass nor more than 97% by mass and more preferably not less than 85% by mass nor more than 95% by mass, based on the total solid content of the outermost layer 19. If this content is less than 80% by mass, the density of the active material becomes lower and the electric capacity tends to decrease; if the content exceeds 97% by mass, the amount of the binder becomes relatively smaller and the coating film tends to become fragile.

The thickness of the outermost layer 19 is preferably smaller than that of the lower layer 17. Specifically, the thickness of the outermost layer 19 is preferably not less than 3 μm nor more than 30 μm and more preferably not less than 5 μm nor more than 28 μm. If this thickness is less than 3 μm, the effect of suppressing the rapid entrance/exit of lithium ions tends to degrade; if it exceeds 30 μm, it becomes difficult to achieve uniform application and the performance as a battery tends to be insufficient because of excessive suppression of entrance/exit of lithium ions.

The lower layer 17 is composed mainly of active material particles, and a binder as the aforementioned outermost layer 19 is. The lower layer 17 may further contain a conductive aid.

The binder and the conductive aid used in the lower layer 17 can be the same as those in the outermost layer 19.

There are no particular restrictions on the active material particles used in the lower layer 17, as long, as they can implement reversible progress of occlusion and release of lithium ions, desorption and insertion (intercalation) of lithium ions, or doping and dedoping with lithium ions and counter anions thereto (e.g., $ClO_4^-$). The active material particles can be well-known anode active material particles. Such active material particles can be, for example, particles of one selected from carbon materials such as natural graphite and artificial graphite (non-graphitizing carbon, graphitizing carbon, low temperature-calcined carbon, etc.), metals such as Al, Si, and Sn capable of combining with lithium, amorphous compounds consisting mainly of an oxide such as $SiO_2$ or $SnO_2$, and lithium titanate ($Li_4Ti_5O_{12}$). Among them, the carbon materials are preferably applicable, and the active material particles are more preferably those with the interlayer distance $d_{002}$ of the carbon material being 0.335-0.338 nm and the crystallite size $Lc_{002}$ of the carbon material being 30-120 nm. The carbon materials satisfying these conditions include artificial graphite, MCF (mesocarbon fiber), and so on. The interlayer distance $d_{002}$ and the crystallite size $Lc_{002}$ can be obtained by X-ray diffractometry.

The average particle size (D50) of the active material particles used in the lower layer 17 is preferably not less than 10 μm nor more than 40 μm and more preferably not less than 12 μm nor more than 35 μm. If the average particle size is less than 10 μm, it becomes hard to disperse the active material particles and it tends to become difficult to form a uniform coating film; if the average particle size exceeds 40 μm, the density of the coating film tends to decrease.

The content of the active material particles in the lower layer 17 is preferably not less than 80% by mass nor more than 97% by mass and more preferably not less than 85% by mass nor more than 95% by mass, based on the total solid content of the lower layer 17. If this content is less than 80% by mass, the density of the active material becomes lower and the electric capacity tends to decrease; if the content exceeds 97% by mass, the amount of the binder becomes relatively smaller and adhesion tends to degrade between the coating film and the current collector.

The thickness of the lower layer 17 is preferably larger than that of the outermost layer 19. Specifically, the thickness of the lower layer 17 is preferably not less than 50 μm nor more than 100 μm and more preferably not less than 60 μm nor more than 90 μm. If this thickness is less than 50 μm, the electric capacity tends to decrease; if the thickness exceeds 100 μm, flow paths of the electrolyte solution are blocked to degrade the high-rate discharge performance and the bond strength tends to decrease between the coating film and the current collector.

For producing the anode 10, first, the aforementioned constituents are mixed and dispersed in a solvent in which the binder can be dissolved, thereby preparing each of a coating solution (slurry or paste or the like) for formation of the lower layer and a coating solution (slurry or paste or the like) for formation of the outermost layer. There are no particular restrictions on the solvent as long as the binder can be dissolved in the solvent. Examples of such solvents include N-methyl-2-pyrrolidone, N,N-dimethylformamide, and so on.

Next, the coating solution for formation of the lower layer is applied onto the surface of the current collector 16, and dried, and the resultant is pressed to form the lower layer 17 on the current collector 16. Where the lower layer 17 consists of a plurality of layers, coating solutions are prepared correspondingly to the respective layers, applied, dried, and pressed to form the respective layers.

Next, the coating solution for formation of the outermost layer is applied onto the surface of the lower layer 17, and dried, and the resultant is pressed to form the outermost layer 19 on the lower layer 17. This completes production of the anode 10 in which the active material-containing layer 18 is formed on the current collector 16.

Examples of application in the application of the coating solution for formation of the lower layer and the coating solution for formation of the outermost layer include metal mask printing, electrostatic coating, dip coating, spray coating, roll coating, a doctor blade method, gravure coating, screen printing, and so on.

The press is implemented, for example, by roll press such as calendering, flat press, or the like and it is desirable in the present invention to use the roll press advantageous in achievement of higher density of the electrode. If processing under high pressure causes such influence as deformation of an anode electrode sheet, the sheet may be hot-pressed under low pressure. In the case of the hot press, the conditions are properly adjusted in consideration of heat resistance of the binder. The temperature during the hot press is normally preferably in the range of 80 to 180° C. The pressure during the press is properly adjusted according to the constituent materials of the respective layers and others so as to satisfy the aforementioned condition for the degrees of flexion of the lower layer 17 and the outermost layer 19. The pressure during the press of the lower layer 17 is normally preferably set to the linear pressure of 245-3432 N/cm (25-350 kgf/cm) and more preferably to the linear pressure of 343-2942 N/cm (35-300 kgf/cm). On the other hand, the pressure during the press of the outermost layer 19 is normally preferably set to the linear pressure of 981-14710 N/cm (100-1500 kgf/cm) and more preferably to the linear pressure of 1177-11768 N/cm (1120-1200 kgf/cm). The anode of the present invention is preferably produced according to the following procedure: the coating solution for formation of the lower layer is applied onto the current collector 16, dried, and pressed to form the lower layer 17; thereafter the coating solution for formation of the outermost layer is applied onto the lower layer 17, dried, and pressed under the pressure higher than that during the formation of the lower layer 17, to form the outermost layer. Another applicable procedure is such that the coating solutions are successively applied onto the current collector 16 and dried to form the unpressed lower layer and outermost layer and then they are pressed together. It is noted that the porosity, density, and degree of flexion of the resulting layer can be adjusted by controlling the linear pressure during the press.

A lithium-ion secondary battery of the present invention will be described below. The lithium-ion secondary battery of the present invention has an anode, a cathode, and an electrolyte layer disposed between the anode and the cathode, and the anode is the aforementioned anode of the present invention.

Figure 3:
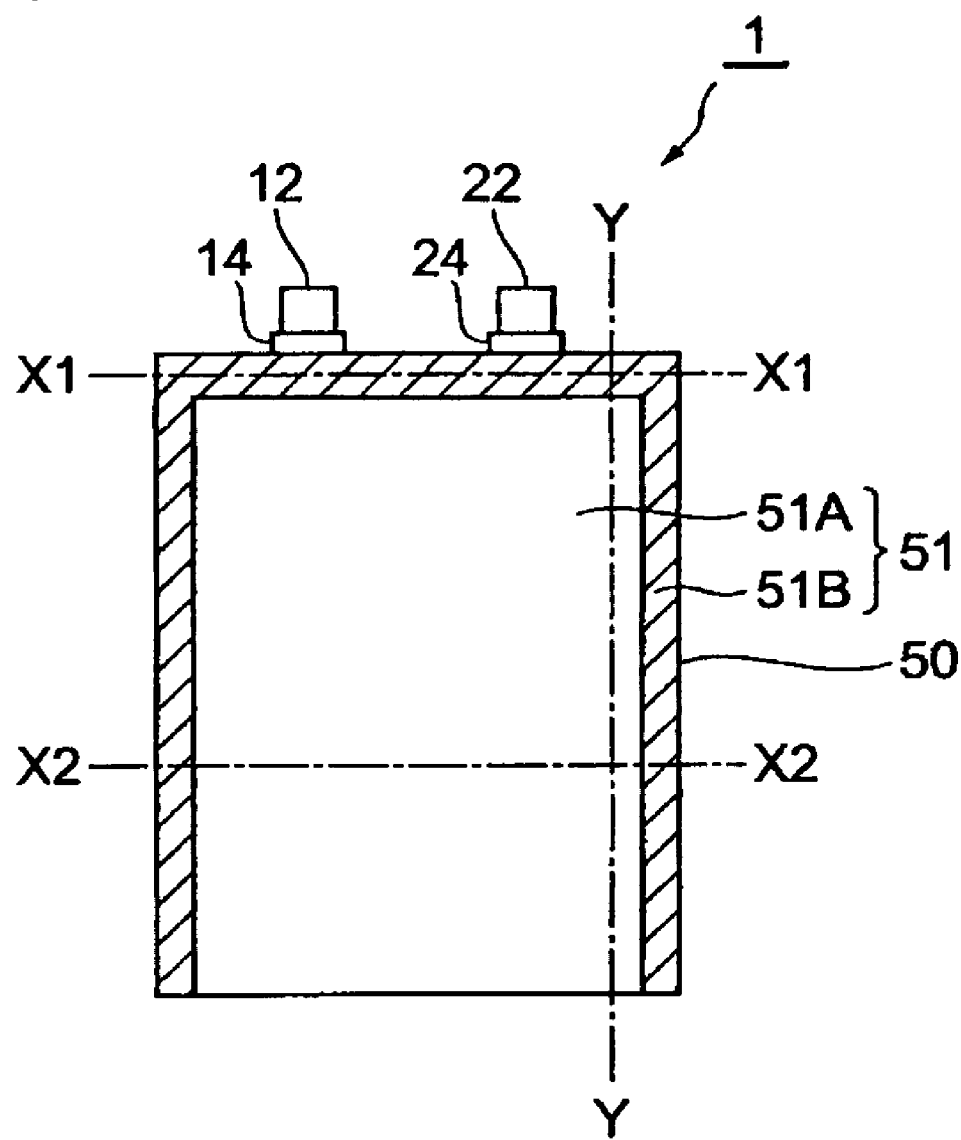
FIG. 3 is a front view showing a preferred embodiment of the lithium-ion secondary battery according to the present invention.
Figure 4:
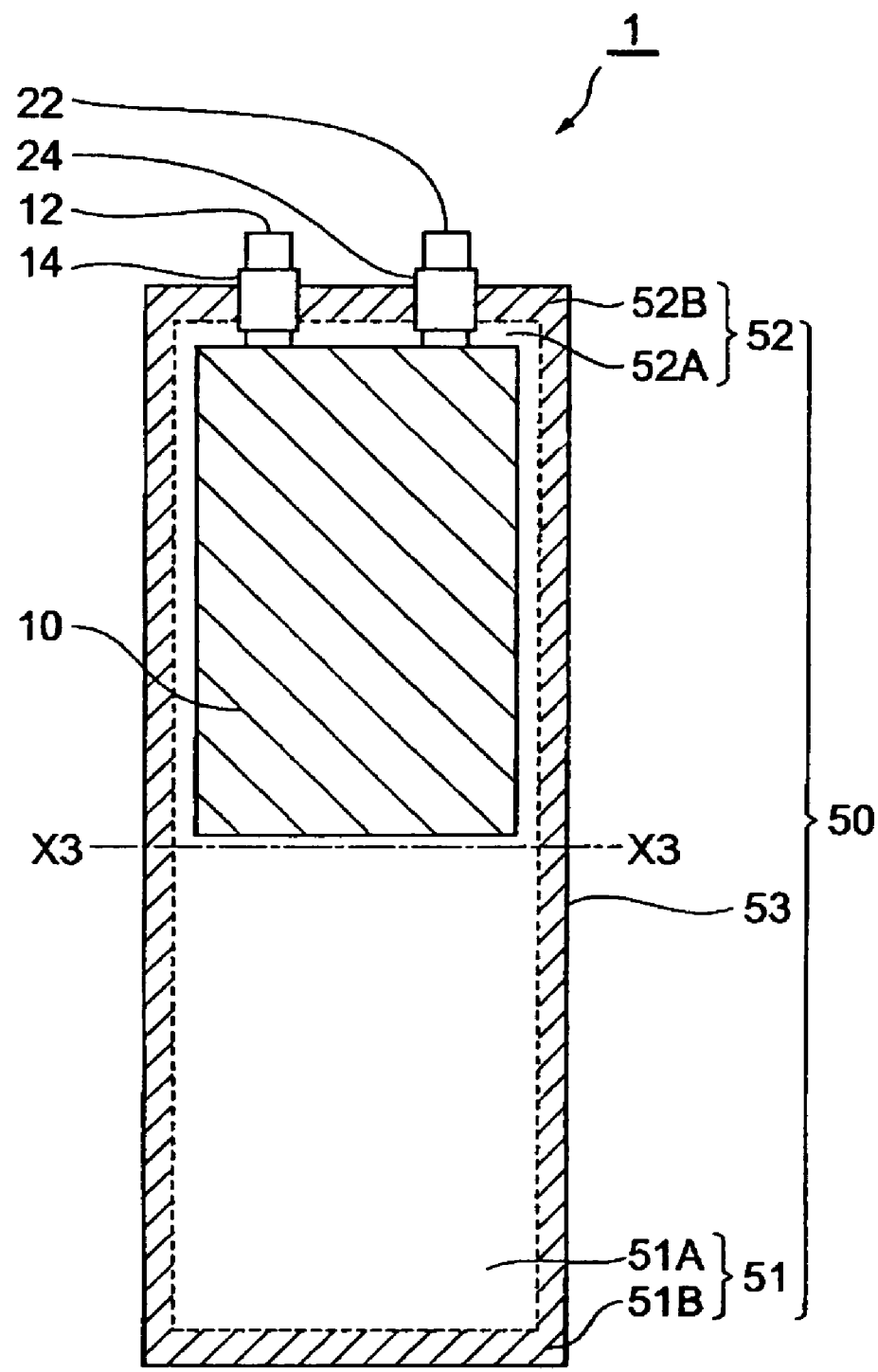
FIG. 4 is a development view in which the interior of the lithium-ion secondary battery shown in FIG. 3 is viewed from a direction of a normal to the surface of anode 10.
Figure 5:
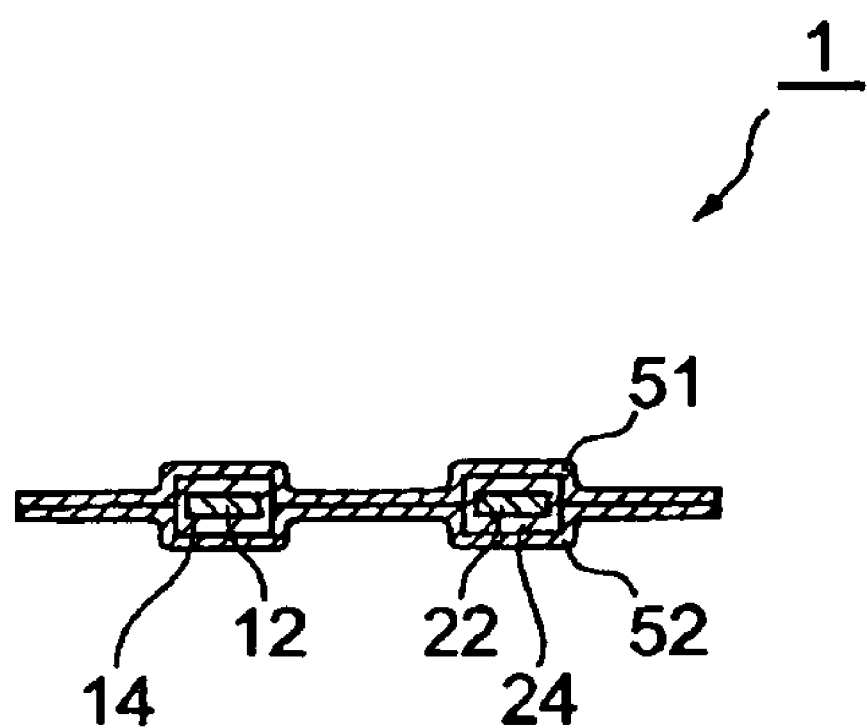
FIG. 5 is a schematic sectional view obtained by cutting the lithium-ion secondary battery shown in FIG. 37 along line X1-X1 in FIG. 3.
Figure 6:
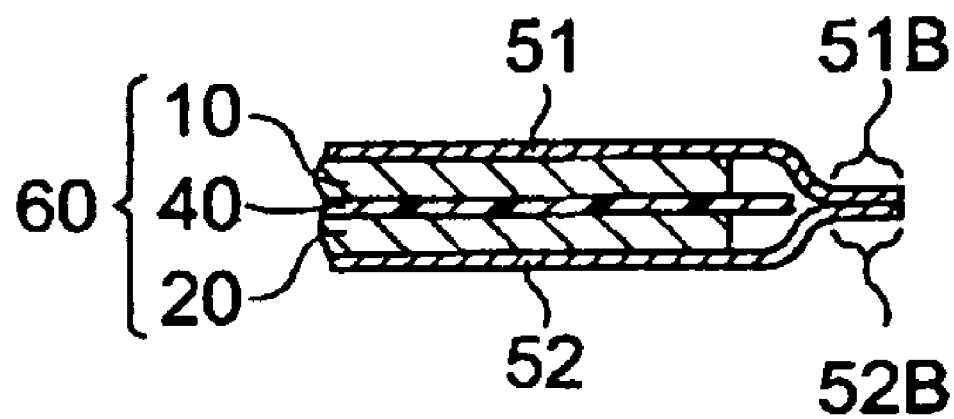
FIG. 6 is a schematic sectional view of the major part obtained by cutting the lithium-ion secondary battery shown in FIG. 3, along line X2-X2 in FIG. 3.
Figure 7:
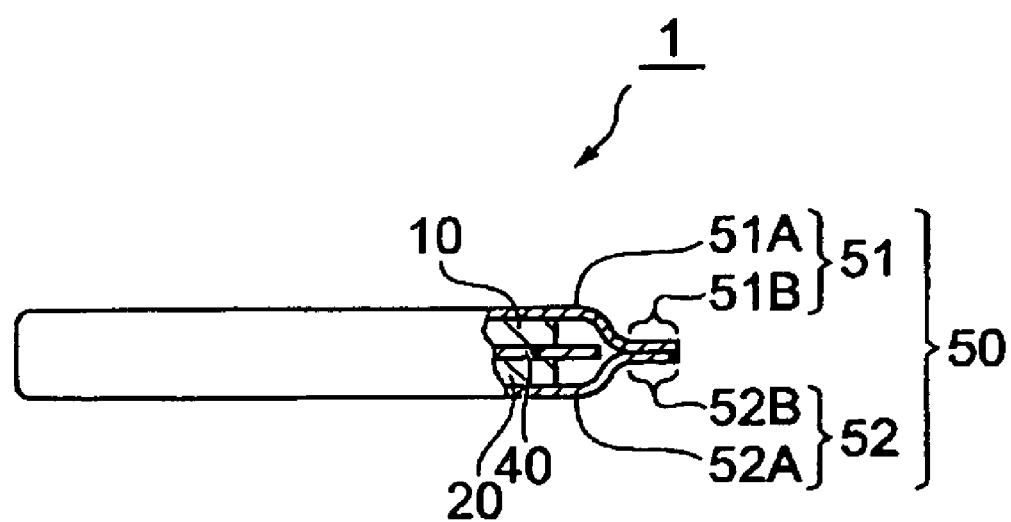
FIG. 7 is a schematic sectional view of the major part obtained by cutting the lithium-ion secondary battery shown in FIG. 3, along line Y-Y in FIG. 3.

FIG. 3 is a front view showing a preferred embodiment of the lithium-ion secondary battery of the present invention. FIG. 4 is a development view in which the interior of the lithium-ion secondary battery shown in FIG. 3 is viewed from a direction of a normal to the surface of the anode 10. Furthermore, FIG. 5 is a schematic sectional view obtained by cutting the lithium-ion secondary battery shown in FIG. 33 along line X1-X1 in FIG. 3. FIG. 6 is a schematic sectional view of the major part obtained by cutting the lithium-ion secondary battery shown in FIG. 3, along line X2-X2 in FIG. 3. FIG. 7 is a schematic sectional view of the major part obtained by cutting the lithium-ion secondary battery shown in FIG. 3, along line Y-Y in FIG. 3.

As shown in FIGS. 3 to 7, the lithium-ion secondary battery 1 is composed mainly of a platelike anode 10 and a platelike cathode 20 facing each other, a platelike separator 40 arranged in proximity to and between the anode 10 and the cathode 20, an electrolyte solution (nonaqueous electrolyte solution in the present embodiment) containing lithium ions, a case 50 housing these in a hermetically closed state, an anode lead 12 one end of which is electrically connected to the anode 10 and the other end of which is projecting outward from the case 50, and a cathode lead 22 one end of which is electrically connected to the cathode 20 and the other end of which is projecting outward from the case 50.

The anode 10 herein is the above-described anode 10 of the present invention.

Figure 10:
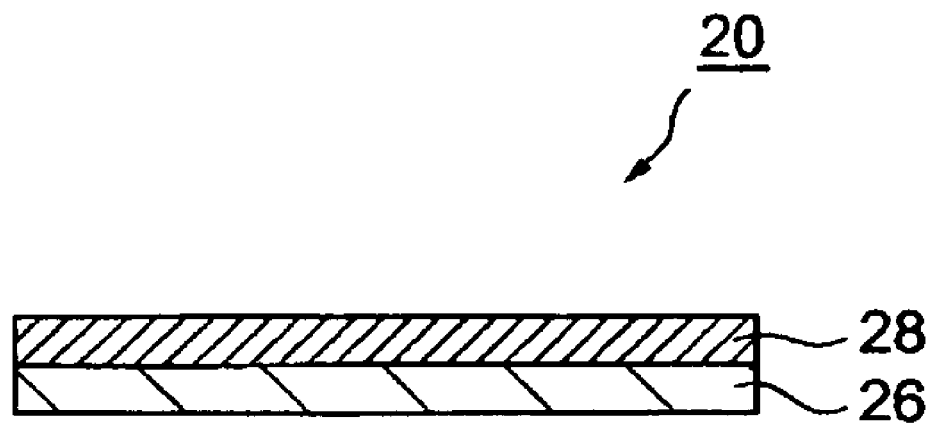
FIG. 10 is a schematic sectional view showing an example of a basic configuration of a cathode 20 in the lithium-ion secondary battery shown in FIG. 3.

FIG. 10 is a schematic sectional view showing an example of the basic configuration of the cathode 20 in the lithium-ion secondary battery 1 shown in FIG. 3. As shown in FIG. 10, the cathode 20 is composed of a current collector 26, and a cathode active material-containing layer 28 formed on the current collector 26.

There are no particular restrictions on the current collector 26 as long as it is a good conductor capable of implementing adequate movement of charge to the cathode material-containing layer 28. The current collector 26 can be one of the current collectors used in the well-known lithium-ion secondary batteries. For example, the current collector 26 can be a metal foil of copper, aluminum, or the like.

The cathode active material-containing layer 28 is composed mainly of a cathode active material and a binder. The cathode active material-containing layer 28 preferably further contains a conductive aid.

There are no particular restrictions on the cathode active material as long as it can implement reversible progress of occlusion and release of lithium ions, desorption and insertion (intercalation) of lithium ions, or doping and dedoping with lithium ions and counter anions (e.g., $ClO_4^-$) to the lithium ions. The cathode active material can be one of the known electrode active materials. Examples thereof include lithium cobaltate ($LiCoO_2$), lithium nickelate ($LiNiO_2$), lithium manganese spinel ($LiMn_2O_4$), and composite metal oxides represented by general formula: $LiNi_xCo_yMn_zO_2$ (x+y z=1), and composite metal oxides such as lithium vanadium compounds ($LiV_2O_5$), olivine type $LiMPO_4$ (where M is Co, Ni, Mn, or Fe), and lithium titanate ($Li_4Ti_5O_{12}$).

The binder used in the cathode 20 can be the same as the binder used in the anode 10. The conductive aid used according to need in the cathode 20 can be the same as the conductive aid used in the anode 10.

The current collector of the cathode 20 is electrically connected to one end of the cathode lead 22, for example, made of aluminum and the other end of the cathode lead 22 extends outward from the case 50. On the other hand, the current collector of the anode 10 is also electrically connected to one end of the anode lead 12, for example, made of copper or nickel, and the other end of the anode lead 12 extends outward from the case 50.

There are no particular restrictions on the separator 40 disposed between the anode 10 and the cathode 20, as long as it is made of a porous material having ion permeability and electrical insulation. The separator 40 can be one of the separators used in the well-known lithium-ion secondary batteries. Examples of such separators 40 include film laminates of polyethylene, polypropylene, or polyolefin, stretched films of mixtures of the foregoing polymers, nonwoven fabric of fiber consisting of at least one constituent material selected from the group consisting of cellulose, polyester, and polypropylene, and so on.

The electrolyte solution (not shown) is filled in the interior space of the case 50 and part thereof is contained in the interior of the anode 10, cathode 20, and separator 40. The electrolyte solution used herein is a nonaqueous electrolyte solution in which a lithium salt is dissolved in an organic solvent. The lithium salt used herein is, for example, one of salts such as $LiPF_6$, $LiClO_4$, $LiBF_4$, $LiAsF_6$, $LiCF_3SO_3$, $LiCF_3$, $LiCF_2SO_3$, $LiC(CF_3SO_2)_3$, $LiN(CF_3CF_3SO_2)_2$, $LiN(CF_3CF_2SO_2)_2$, $LiN(CF_3SO_2)(C_4F_9SO_2)$, and $LiN(CF_3CF_2CO)_2$. These salts may be used singly or in combination of two or more. The electrolyte solution may be used in a gel form with an additive of a polymer or the like.

The organic solvent used herein can be one of solvents used in the well-known lithium-ion secondary batteries. Examples of solvents preferably applicable include propylene carbonate, ethylene carbonate, and diethylcarbonate. These may be used singly or as a mixture of two or more at any ratio.

The case 50 is made of a pair of films (first film 51 and second film 52) opposed to each other. It is noted herein that the first film 51 and the second film 52 in the present embodiment are coupled to each other, as shown in FIG. 4. Specifically, the case 50 in the present embodiment is made by folding a rectangular film consisting of a sheet of composite packaging film, on a fold line X3-X3 in FIG. 4, superimposing a set of opposed edges of the rectangular film (edge 51B of the first film 51 and edge 52B of the second film 52 in the drawing) on each other, and bonding them to each other with an adhesive or by heat sealing. Partial region 51A in FIGS. 3 and 4 and partial region 52A in FIG. 4 indicate regions that are not bonded with an adhesive or by heat sealing in the first film 51 and the second film 52, respectively.

The first film 51 and the second film 52 indicate respective portions of a sheet of rectangular film having mutually facing surfaces made by folding the film as described above. In the present specification, the respective edges of the first film 51 and the second film 52 after bonded will be referred to as "sealed portions."

This eliminates a need for providing the region along the fold line X3-X3 with a sealed portion for joining between the first film 51 and the second film 52, and thus reduces the number of sealed portions in the case 50. As a result, it further increases the volume energy density based on the volume of the space in which the lithium-ion secondary battery 1 is to be installed.

In the present embodiment, as shown in FIGS. 3 and 4, one end of the anode lead 12 connected to the anode 10 and one end of the cathode lead 22 connected to the cathode 20 are arranged so as to project outward from the sealed portion in which the aforementioned edge 51B of the first film 51 and edge 52B of the second film 52 are joined together.

The film forming the first film 51 and the second film 52 is a flexible film. Since the film is lightweight and easy to be thinned, the lithium-ion secondary battery itself can be formed in a low profile. For this reason, it is easy to increase the original volume energy density and also to increase the volume energy density based on the volume of the space in which the lithium-ion secondary battery is to be installed.

There are no particular restrictions on this film as long as it is a flexible film. The film is preferably a "composite packaging film" having at least an innermost layer of a polymer in contact with a power-generating element 60, and a metal layer located on the side opposite to the side where the innermost layer is in contact with the power-generating element, from the viewpoints of ensuring sufficient mechanical strength and lightweight property of the case and effectively preventing intrusion of water and air from the outside of the case 50 into the inside of the case 50 and escape of the electrolyte component from the inside of the case 50 to the outside of the case 50.

Figure 8:
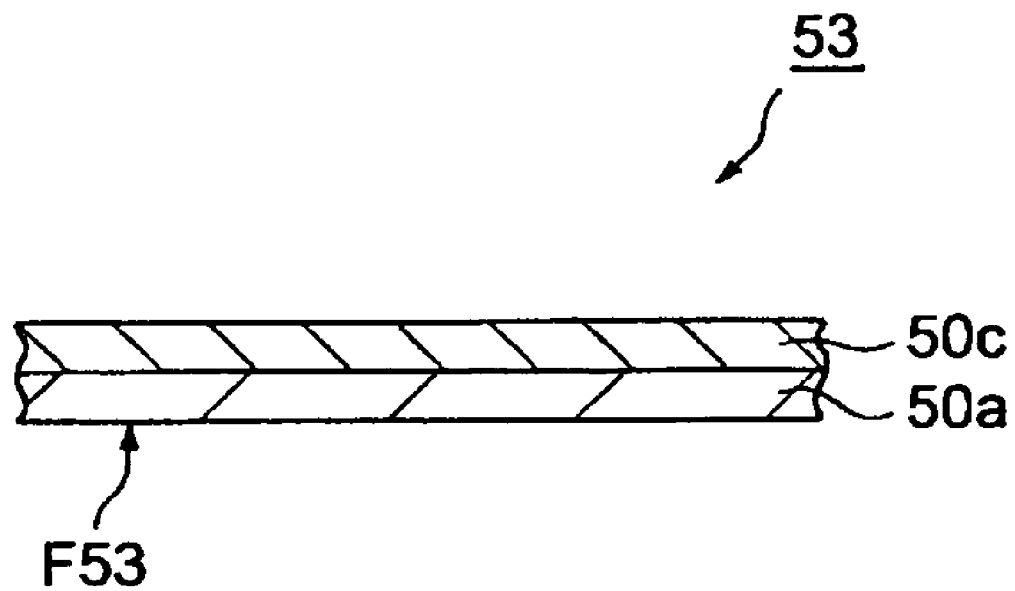
FIG. 8 is a schematic sectional view showing an example of a basic configuration of a film as a constituent material of a case in the lithium-ion secondary battery shown in FIG. 3.
Figure 9:
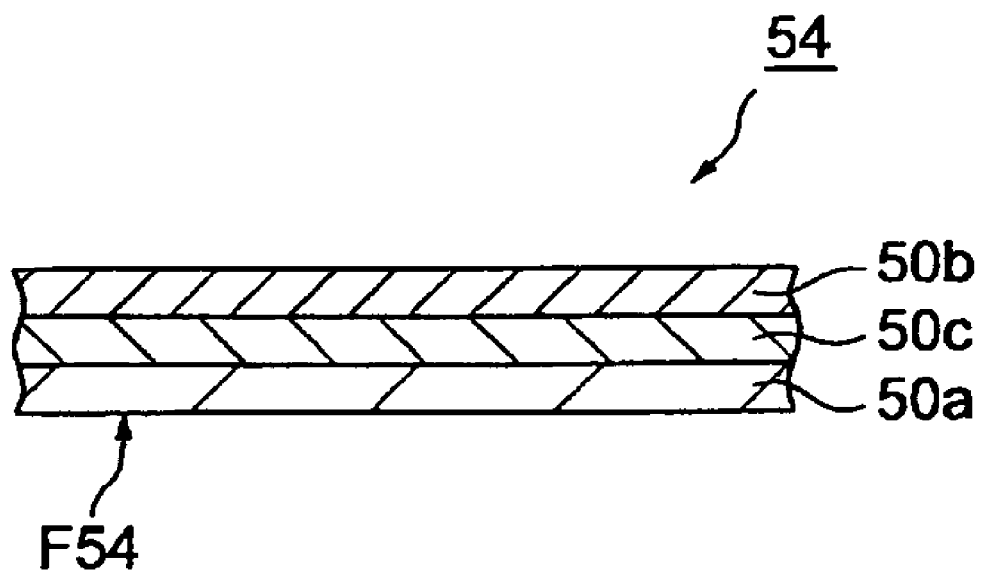
FIG. 9 is a schematic sectional view showing another example of the basic configuration of the film as a constituent material of the case in the lithium-ion secondary battery shown in FIG. 3.

The composite packaging film applicable as the first film 51 and second film 52 can be, for example, a composite packaging film in one of structures shown in FIG. 8 and FIG. 9. The composite packaging film 53 shown in FIG. 8 has an innermost layer 50a of a polymer with an inner surface F53 in contact with the power-generating element 60, and a metal layer 50c disposed on the other surface (outer surface) of the innermost layer 50a. The composite packaging film 54 shown in FIG. 9 has a structure in which an outermost layer 50b of a polymer is further disposed on the outer surface of the metal layer 50c in the composite packaging film 53 shown in FIG. 8.

There are no particular restrictions on the composite packaging film applicable as the first film 51 and second film 52 as long as it is a composite packaging material having two or more layers including at least one polymer layer, e.g., the innermost layer, and the metal layer of metal foil or the like. From the viewpoint of achieving the same effect as above more definitely, the composite packaging film is more preferably composed of three or more layers including the innermost layer 50a, the outermost layer 50b of a polymer disposed on the outer surface side of the case 50 farthest from the innermost layer 50a, and at least one metal layer 50c disposed between the innermost layer 50a and the outermost layer 50b as in the composite packaging film 54 shown in FIG. 9.

The innermost layer 50a is a layer with flexibility and there are no particular restrictions on a constituent material thereof as long as it is a polymer that can exhibit the aforementioned flexibility and that has chemical stability (resistance to chemical reaction, dissolution, and swelling) to the nonaqueous electrolyte solution used and chemical stability to oxygen and water (water in air). However, the constituent material is preferably a material with low permeability for oxygen, water (water in air), and the components of the nonaqueous electrolyte solution. The material can be selected, for example, from engineering plastics and thermoplastic resins such as polyethylene, polypropylene, acid-modified polyethylene, acid-modified polypropylene, polyethylene ionomer, and polypropylene ionomer.

The "engineering plastics" means plastics with excellent mechanical characteristics, thermal resistance, and endurance as used in mechanical components, electrical components, residential materials, etc., and examples thereof include polyacetal, polyamide, polycarbonate, poly(oxytetramethylene-oxyterephthaloyl) polybutylene terephthalate), polyethylene terephthalate, polyimide, and polyphenylene sulfide.

When a polymer layer like the outermost layer 50b is further provided in addition to the innermost layer 50a as in the composite packaging film 54 shown in FIG. 9, this polymer layer may be made using a constituent material similar to the innermost layer 50a.

The metal layer 50c is preferably a layer made of a metal material with corrosion resistance to oxygen, water (water in air), and the nonaqueous electrolyte solution. For example, the metal layer 50c may be made of a metal foil of aluminum, an aluminum alloy, titanium, or chromium.

There are no particular restrictions on how to seal all the sealed portions in the case 50, but the heat sealing method is preferably applicable in terms of productivity.

As shown in FIGS. 3 and 4, the portion of the anode lead 12 in contact with the sealed portion of the exterior bag consisting of the edge 51B of the first film 51 and the edge 52B of the second film 52 is covered by an insulator 14 for preventing contact between the anode lead 12 and the metal layer in the composite packaging film forming each film. Furthermore, the portion of the cathode lead 22 in contact with the sealed portion of the exterior bag consisting of the edge 51B of the first film 51 and the edge 52B of the second film 52 is covered by an insulator 24 for preventing contact between the cathode lead 22 and the metal layer in the composite packaging film forming each film.

There are no particular restrictions on configurations of these insulators 14 and 24, but each of them may be made, for example, of a polymer. It is also possible to adopt a configuration without these insulators 14 and 24 if the contact of the metal layer in the composite packaging film is adequately prevented to each of the anode lead 12 and the cathode lead 22.

Next, the aforementioned lithium-ion secondary battery 1 can be produced, for example, according to the following procedure. First, the anode lead 12 and the cathode lead 22 are electrically connected to the anode 10 and to the cathode 20, respectively. Thereafter, the separator 40 is placed in contact between the anode 10 and the cathode 20 preferably, in a non-bonded state), thereby completing the power-generating element 60.

Then the case 50 is produced, for example, according to the following method. First, where the first film and the second film are made of the aforementioned composite packaging film, the film is produced by one of the known methods such as dry lamination, wet lamination, hot melt lamination, and extrusion lamination. Prepared are a film for the polymer layer, and a metal foil of aluminum or the like, which constitute the composite packaging film. The metal foil can be prepared, for example, by rolling a metal material.

Next, the composite packaging film (multilayered film) is produced, preferably, in the aforementioned structure of plural layers, for example, by bonding the metal foil onto the film for the polymer layer with an adhesive. Then the composite packaging film is cut in predetermined size to prepare a sheet of rectangular film.

Next, as described above with reference to FIG. 4, the sheet of film is folded and the sealed portion 51B (edge 51B) of the first film 51 and the sealed portion 52B (edge 52B) of the second film 52 are heat-sealed in a desired seal width under a predetermined heat condition, for example, with a sealing machine. At this time, the film is left without being heat-sealed in part, in order to secure an aperture for introducing the power-generating element 60 into the case 50. This obtains the case 50 in a state with the aperture.

Then the power-generating element 60 with the anode lead 12 and the cathode lead 22 being electrically connected thereto is put into the interior of the case 50 with the aperture. Then the electrolyte solution is poured into the interior. Subsequently, the aperture of the case 50 is sealed with a sealing machine in a state in which the anode lead 12 and the cathode lead 22 each are inserted in part in the case 50. The case 50 and the lithium-ion secondary battery 1 are completed in this manner. It should be noted that the lithium-ion secondary battery of the present invention is not limited to this shape but may also be formed in any other shape such as a cylindrical shape.

The above detailed the preferred embodiment of the lithium-ion secondary battery of the present invention, but the present invention is by no means intended to be limited to the above embodiment. For example, in the description of the above embodiment, the sealed portions of the lithium-ion secondary battery 1 may be folded to achieve a more compact structure. The above embodiment described the lithium-ion secondary battery 1 with one each of the anode 10 and cathode 20, but the lithium-ion secondary battery may be constructed in a configuration wherein there are two or more of each of the anode 10 and cathode 20 and wherein a separator 40 is always located between the anode 10 and cathode 20.

The present invention will be described below in more detail on the basis of examples and comparative examples.

EXAMPLE 1

90 parts by mass of graphite (average particle size: 24 μm) as an anode active material, 2 parts by mass of acetylene black as a conductive aid, and 8 parts by mass of polyvinylidene fluoride (PVdF) as a binder were mixed and dispersed with a planetary mixer and thereafter the viscosity of the mixture was adjusted with an appropriate amount of NMP to obtain a coating solution for formation of the lower layer in the form of a slurry.

The coating solution for formation of the lower layer thus obtained was applied onto a copper foil (15 μm) as a current collector by the doctor blade method so as to achieve an active material-supported amount of 10.5 mg/cm$^2$, and was then dried. The resultant anode sheet was pressed by calendering under the linear pressure of 2648 N/cm (270 kgf/cm). This resulted in forming the lower layer on the current collector.

Furthermore, 90 parts by mass of graphite (average particle size: 5.6 μm, aspect ratio: 9) as an anode active material, 2 parts by mass of acetylene black as a conductive aid, and 8 parts by mass of polyvinylidene fluoride (PVdF) as a binder were mixed and dispersed with a planetary mixer and thereafter the viscosity of the mixture was adjusted with an appropriate amount of NMP to obtain a coating solution for formation of the outermost layer in the form of a slurry.

The coating solution for formation of the outermost layer thus obtained was applied onto the aforementioned lower layer by the doctor blade method so as to achieve an active material-supported amount of 2.0 mg/cm$^2$, and was dried. The resultant anode sheet was pressed by calendering under the linear pressure of 5884 N/cm (600 kgf/cm). This resulted in forming the outermost layer on the lower layer. In the anode sheet after the press, the thickness of the outermost layer was 15 μm and the thickness of the lower layer 67 μm. The anode sheet after the press was punched in the size of 31 mm×41.5 mm to obtain a desired anode.

EXAMPLE 2

An anode was produced in the same manner as in Example 1, except that graphite with the average particle size of 1.5 μm and the aspect ratio of 3 was used as the anode active material for the outermost layer. In the anode sheet after the press of the outermost layer, the thickness of the outermost layer was 17 μm and the thickness of the lower layer 65 μm.

EXAMPLE 3

An anode was produced in the same manner as in Example 1, except that graphite with the average particle size of 9.2 μm and the aspect ratio of 12 was used as the anode active material for the outermost layer and the linear pressure was 8336 N/cm (850 kgf/cm) in the press by calendering of the anode sheet for formation of the outermost layer. In the anode sheet after the press, the thickness of the outermost layer was 13 μm and the thickness of the lower layer 63 μm.

EXAMPLE 4

An anode was produced in the same manner as in Example 1, except that the linear pressure was 2059 N/cm (210 kgf/cm) in the press by calendering of the anode sheet for formation of the lower layer. In the anode sheet after the press of the outermost layer, the thickness of the outermost layer was 16 μm and the thickness of the lower layer 68 μm.

EXAMPLE 5

An anode was produced in the same manner as in Example 1, except that the linear pressure was 2991 N/cm (305 kgf/cm) in the press by calendering of the anode sheet for formation of the lower layer. In the anode sheet after the press of the outermost layer, the thickness of the outermost layer was 15 μm and the thickness of the lower layer 64 μm.

EXAMPLE 6

An anode was produced in the same manner as in Example 1, except that the active material-supported amount of the outermost layer was 4.0 mg/cm$^2$. In the anode sheet after the press of the outermost layer, the thickness of the outermost layer was 30 μm and the thickness of the lower layer 68 μm.

EXAMPLE 7

An anode was produced in the same manner as in Example 1, except that the active material-supported amount of the outermost layer was 0.5 mg/cm$^2$. In the anode sheet after the press of the outermost layer, the thickness of the outermost layer was 3 μm and the thickness of the lower layer 67 μm.

EXAMPLE 8

An anode was produced in the same manner as in Example 1, except that the active material-supported amount of the lower layer was 7.8 mg/cm$^2$. In the anode sheet after the press of the outermost layer, the thickness of the outermost layer was 14 μm and the thickness of the lower layer 50 μm.

EXAMPLE 9

An anode was produced in the same manner as in Example 1, except that the active material-supported amount of the lower layer was 16.2 mg/cm$^2$. In the anode sheet after the press of the outermost layer, the thickness of the outermost layer was 16 μm and the thickness of the lower layer 100 μm.

EXAMPLE 10

An anode was produced in the same manner as in Example 1, except that graphite with the average particle size of 1.5 μm and the aspect ratio of 3 was used as the anode active material for the outermost layer and the linear pressure was 11768 N/cm (1200 kgf/cm) in the press by calendering of the anode sheet for formation of the outermost layer. In the anode sheet after the press, the thickness of the outermost layer was 14 μm and the thickness of the lower layer 65 μm.

EXAMPLE 11

An anode was produced in the same manner as in Example 1, except that graphite with the average particle size of 20 μm and the aspect ratio of 20 was used as the anode active material for the outermost layer and the linear pressure was 1177 N/cm (120 kgf/cm) in the press by calendering of the anode sheet for formation of the outermost layer. In the anode sheet after the press, the thickness of the outermost layer was 25 μm and the thickness of the lower layer 69 μm.

COMPARATIVE EXAMPLE 1

90 parts by mass of graphite (average particle size: 24 μm) as an anode active material, 2 parts by mass of acetylene black as a conductive aid, and 8 parts by mass of polyvinylidene fluoride (PVdF) as a binder were mixed and dispersed with a planetary mixer and thereafter the viscosity of the mixture was adjusted with an appropriate amount of NMP to obtain a coating solution in the form of a slurry.

The coating solution thus obtained was applied onto a copper foil (15 μm) as a current collector by the doctor blade method so as to achieve an active material-supported amount of 11 mg/cm$^2$, and was dried. This resulted in obtaining an anode sheet in which the anode active material-containing layer was formed on the current collector. The resultant anode sheet was pressed by calendering under the linear pressure of 1569 N/cm (160 kgf/cm). The thickness of the anode active material-containing layer after the press was 81 μm. The anode sheet after the press was punched in the size of 31 mm×41.5 mm to obtain a desired anode.

COMPARATIVE EXAMPLE 2

An anode was produced in the same manner as in Comparative Example 1, except that the linear pressure in the press by calendering was 2648 N/cm (270 kgf/cm). The thickness of the anode active material-containing layer after the press was 74 μm.

COMPARATIVE EXAMPLE 3

An anode was produced in the same manner as in Comparative Example 1, except that the linear pressure in the press by calendering was 3138 N/cm (320 kgf/cm). The thickness of the anode active material-containing, layer after the press was 72 μm.

COMPARATIVE EXAMPLE 4

An anode was produced in the same manner as in Comparative Example 1, except that the linear pressure in the press by calendering was 3923 N/cm (400 kgf/cm). The thickness of the anode active material-containing layer after the press was 62 μm.

<Measurement of Degree of Flexion>

Figure 11:
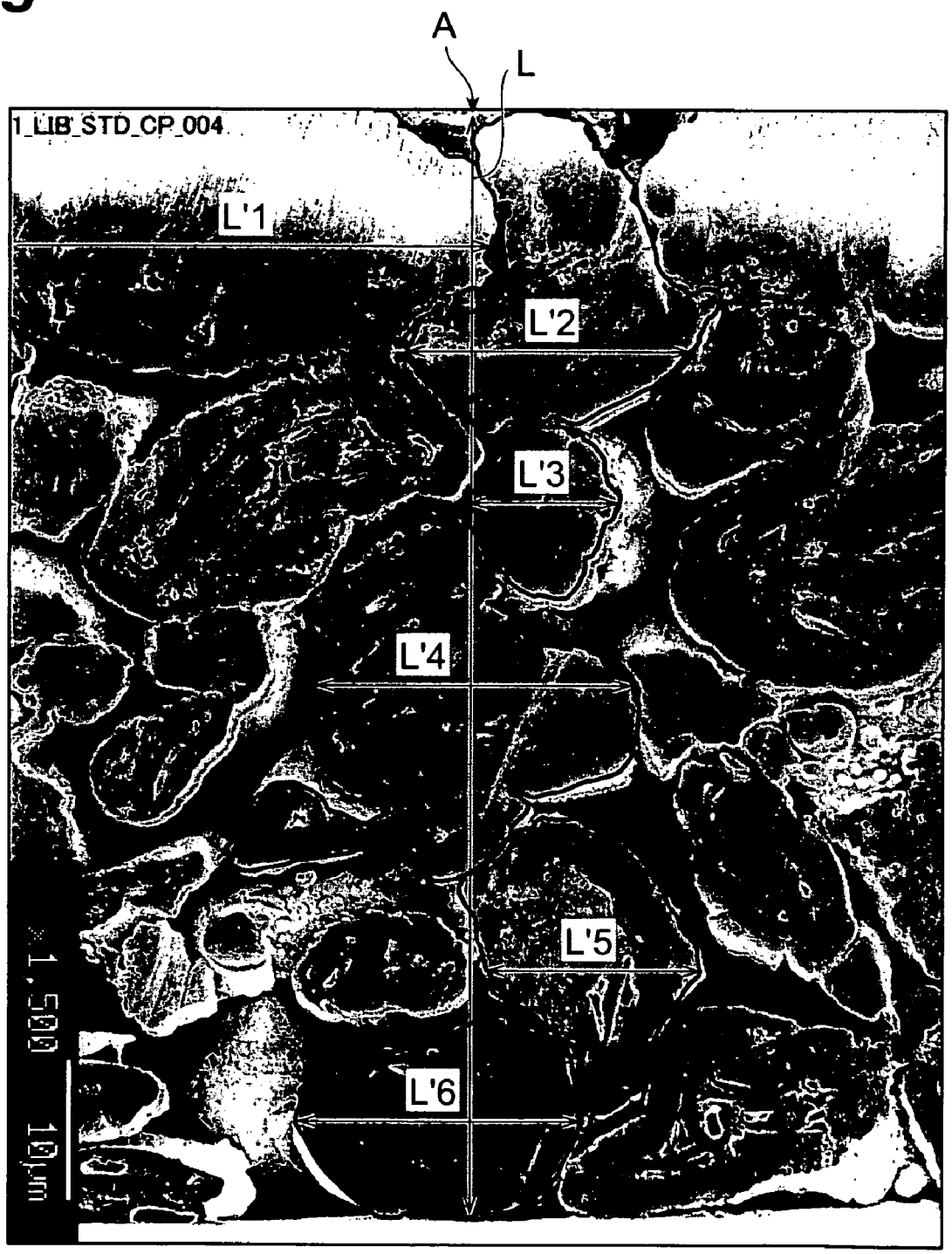
FIG. 11 is an SEM photograph (magnification: ×1500; field: 65 μm×8 μm) of a cross section of an anode active material-containing layer in the anode in Comparative Example 1.

With each of the anodes obtained in Examples 1-11 and Comparative Examples 1-4, the degree of flexion was determined from SEM images of cross sections of the anode active material-containing layer. FIG. 11 is an SEM photograph (magnification: ×1500) of a cross section of the anode active material-containing layer in the anode of Comparative Example 1. As shown in FIG. 11, a straight line A was drawn perpendicularly to the anode active material-containing layer (or in parallel with the direction of thickness of the anode active material-containing layer) in the center of the taken SEM photograph, measurement of lengths was conducted to obtain the length L of the straight line A and the value L' (L'1+L'2+L'3+L'4+L'5+L'6) as the sum of lateral maximum diameters of active material particles 15 crossing the straight line A, and the value of (L'/L) was calculated. Similarly, a total of ten SEM photographs were taken for cross sections of the anode active material-containing layer in the anode of Comparative Example 1, and an average of values of (L'/L) measured from the respective SEM photographs was defined as the degree of flexion. The degree of flexion was also determined by the same technique, for the other examples and comparative examples. In each of the examples, the degree of flexion was determined for each of the lower layer and the outermost layer. The magnification of SEM photographs in the measurement of the degree of flexion was not limited to ×1500, but was properly increased or decreased for easier determination of L' and L. The results are presented in Table 1.

<Measurement of Density of Active Material-Containing Layer>

The apparent density (g/cm$^3$) of the anode active material-containing layer in each of the anodes of Examples 1-11 and Comparative Examples 1-4 was calculated from the mass, thickness, and area of the anode active material-containing layer. The results are presented in Table 1.

<Measurement of Discharge Rate Performance>

An electrode evaluation cell was produced according to the following procedure, using each of the anodes obtained in Examples 1-11 and Comparative Examples 1-4. Specifically, the anode and a Li foil (100 μm thick) as a counter electrode were stacked with the separator of polyethylene in between them, to obtain a laminate (element body). This laminate was put into an aluminum laminate package, 1M LiPF$_6$/PC as an electrolyte solution was poured into this aluminum laminate package, and it was sealed in vacuum to produce the electrode evaluation cell (48 mm long, 34 mm wide, and 2 mm thick). With the electrode evaluation cell thus obtained, constant-current discharge was conducted at the discharge temperature of 25° C. A current value to a discharge end in 5 hours was defined as 0.2 C and a discharge capacity at that time as 0.2 C capacity. A percentage (%) of 4 C capacity was determined relative to 0.2 C capacity as 100%. The results are presented in Table 1.

TABLE 1

| | Degree of flexion of outermost layer | Degree of flexion of lower layer | Thickness of outermost layer [μm] | Thickness of lower layer [μm] | Aspect ratio of active material in outermost layer | Density of active material-containing layer [g/cm$^3$] | Discharge rate performance (4 C/0.2 C) [%] |
|---|---|---|---|---|---|---|---|
| Example 1 | 12 | 2.0 | 15 | 67 | 9 | 1.65 | 35 |
| Example 2 | 3 | 2.0 | 17 | 65 | 3 | 1.60 | 37 |
| Example 3 | 24 | 2.4 | 13 | 63 | 12 | 1.69 | 38 |

TABLE 1-continued

|  | Degree of flexion of outermost layer | Degree of flexion of lower layer | Thickness of outermost layer [μm] | Thickness of lower layer [μm] | Aspect ratio of active material in outermost layer | Density of active material-containing layer [g/cm³] | Discharge rate performance (4 C/0.2 C) [%] |
|---|---|---|---|---|---|---|---|
| Example 4 | 12 | 1.8 | 16 | 68 | 9 | 1.59 | 33 |
| Example 5 | 12 | 3.0 | 15 | 64 | 9 | 1.74 | 37 |
| Example 6 | 12 | 2.0 | 30 | 68 | 9 | 1.70 | 34 |
| Example 7 | 12 | 2.0 | 3 | 67 | 9 | 1.59 | 39 |
| Example 8 | 12 | 2.0 | 14 | 50 | 9 | 1.64 | 35 |
| Example 9 | 12 | 2.0 | 16 | 100 | 9 | 1.61 | 35 |
| Example 10 | 6 | 2.0 | 14 | 65 | 3 | 1.65 | 39 |
| Example 11 | 20 | 2.0 | 25 | 69 | 20 | 1.68 | 38 |
| Comparative Example 1 | — | 1.7 | — | 81 | — | 1.44 | 47 |
| Comparative Example 2 | — | 2.0 | — | 74 | — | 1.57 | 42 |
| Comparative Example 3 | — | 3.2 | — | 72 | — | 1.69 | 39 |
| Comparative Example 4 | — | 4.4 | — | 62 | — | 1.79 | 38 |

In Comparative Examples 3 and 4 with the high degree of flexion, as shown in Table 1, the discharge rate performance is restrained and the rapid entrance/exit of lithium ions can be suppressed during quick charge-discharge. In Comparative Examples 3 and 4, however, the active material particles are arranged as tangled because of the high degree of flexion, and it is thus difficult to secure a buffer zone for expansion during the expansion of the active material particles due to intercalation, so as to lead to insufficient prevention of the deformation of the anode. On the other hand, in Comparative Examples 1 and 2, the active material particles are not arranged as tangled because of the low degree of flexion, and it is thus easy to secure a buffer zone for expansion during the expansion of the active material particles due to intercalation. However, the discharge rate performance is not restrained, and thus suppression of the rapid entrance/exit of lithium ions is insufficient during quick charge-discharge, so as to lead to insufficient prevention of the deformation of the anode and the cathode. It is therefore difficult to produce a desired electrode from the single-layer electrodes as shown in Comparative Examples 1 to 4.

It is confirmed with Examples 1 to 11 that the deformation of both of the anode and the cathode is well prevented during quick charge-discharge and that a lithium-ion secondary battery with excellent safety is successfully obtained when the active material-containing layer of the anode is made by using the layer with the smaller degree of flexion to permit easy securing of the buffer zone for expansion during the expansion of the active material particles due to intercalation, as the lower layer and using the layer with the larger degree of flexion to permit restraint of the discharge rate performance and suppression of the rapid entrance/exit of lithium ions during quick charge-discharge.

What is claimed is:

1. An anode for lithium-ion secondary battery comprising:
a current collector; and
an active material-containing layer formed on the current collector,
wherein the active material-containing layer is comprised of an outermost layer disposed on the farthest side from the current collector, and a lower layer composed of at least one layer disposed between the outermost layer and the current collector, the outermost layer has a structure in which active material particles are bound by a binder, and the lower layer has a structure in which active material particles are bound by a binder,
wherein a degree of flexion of the outermost layer is larger than a degree of flexion of the lower layer,
wherein the degree of flexion of the lower layer is not less than 1.8 nor more than 3.0, and
wherein an average particle size of the active material particles contained in the outermost layer is smaller than an average particle size of the active material particles contained in the lower layer,
the degree of flexion of the outermost layer and the degree of flexion of the lower layer being defined as ratio: L'/L where L is a thickness of a layer, which is any of the outermost layer and the lower layer, obtained by drawing a straight line A perpendicular to the layer, and
L' is a numerical value, in the same unit as L, of a sum of maximum diameters of active material particles crossing the straight line A in a lateral direction perpendicular to the straight line A.

2. The anode according to claim 1, wherein the degree of flexion of the outermost layer is not less than 3.0 nor more than 24.0.

3. The anode according to claim 1, wherein a thickness of the outermost layer is smaller than a thickness of the lower layer.

4. The anode according to claim 2, wherein a thickness of the outermost layer is smaller than a thickness of the lower layer.

5. The anode according to claim 3, wherein the thickness of the outermost layer is not less than 3 μm nor more than 30 μm and wherein the thickness of the lower layer is not less than 50 μm nor more than 100 μm.

6. The anode according to claim 4, wherein the thickness of the outermost layer is not less than 3 μm nor more than 30 μm and wherein the thickness of the lower layer is not less than 50 μm nor more than 100 μm.

7. The anode according to claim 1, wherein a thickness of the outermost layer is not less than 3 μm nor more than 30 μm and wherein a thickness of the lower layer is not less than 50 μm nor more than 100 μm.

8. The anode according to claim 2, wherein a thickness of the outermost layer is not less than 3 μm nor more than 30 μm and wherein a thickness of the lower layer is not less than 50 μm nor more than 100 μm.

9. The anode according to claim 1, wherein an aspect ratio of active material particles contained in the outermost layer is not less than 3 nor more than 20.

10. A lithium-ion secondary battery comprising an anode, a cathode, and an electrolyte layer disposed between the anode and the cathode, wherein said anode is the anode as set forth in claim 1.

11. The anode according to claim 1, wherein the average particle size of the active material particles contained in the outermost layer is not less than 1.5 μm nor more than 20 μm and, the average particle size of the active material particles contained in the lower layer is not less than 24 μm nor more than 40 μm.

12. The anode according to claim 1, wherein the active material particles are carbon materials.

\* \* \* \* \*